United States Patent

[11] 3,604,060

| [72] | Inventor | Hans Lundstrom<br>Robertsfors, Sweden |
|---|---|---|
| [21] | Appl. No. | 874,474 |
| [22] | Filed | Nov. 6, 1969 |
| [45] | Patented | Sept. 14, 1971 |
| [73] | Assignee | Allmanna Svenska Elektriska Aktiebolaget<br>Vasteras, Sweden |
| [32] | Priority | Nov. 14, 1968 |
| [33] | | Sweden |
| [31] | | 15430/68 |

[54] PRESS TOOL FOR MANUFACTURING ROD AND TUBES BY COMPRESSING POWDER
3 Claims, 4 Drawing Figs.

[52] U.S. Cl. .................................................. 18/5 H,
18/DIG. 44
[51] Int. Cl. .................................................. B30b 5/02,
B30b 11/00
[50] Field of Search ........................................... 18/5 H

[56] References Cited
UNITED STATES PATENTS

| 2,152,738 | 4/1939 | Jeffery | 18/5 H UX |
| 2,449,407 | 9/1948 | Mulholland | 18/5 H |
| 3,034,191 | 5/1962 | Schaefer et al. | 18/5 H UX |
| 3,172,153 | 3/1965 | Loomis et al. | 18/5 H |
| 3,193,900 | 7/1965 | Wendt | 8/5 H X |
| 3,319,292 | 5/1967 | Witkin | 18/5 H |
| 3,477,096 | 11/1969 | Bowler et al. | 18/5 H |
| 3,529,321 | 9/1970 | Culand | 18/5 H |

*Primary Examiner*— J. Howard Flint, Jr.
*Attorney*—Jennings Bailey, Jr.

ABSTRACT: A press tool has an elongated mould cavity for the production of bodies by compression of powder enclosed in the mould cavity. The mould cavity is formed by an elastomeric sheath within a support cylinder arrangement which is mounted in a high pressure cylinder with a space therebetween. The interior of the support cylinder arrangement communicates through lateral openings with such space. The space, which is filled with pressure fluid, has a narrow part opposite the openings and a larger part in which a compression piston is slidable. An ejection mechanism is composed of a cylinder having an eccentric bore turnably mounted beneath the mould cavity with a piston projecting therefrom, the position of which is radially adjustably by turning the cylinder. The device is placed between two relatively movable press parts, one of which carries a member which projects into the mould cavity while the other engages the compression piston.

PRESS TOOL FOR MANUFACTURING ROD AND TUBES BY COMPRESSING POWDER

BACKGROUND OF THE INVENTION

1. Field of the Invention

The present invention relates to a tool for manufacturing rods and tubes by compressing powder which is enclosed in an elastomeric sheath, by subjecting the sheath to a high liquid pressure which presses the sheath laterally with considerable force against the enclosed powder and thus compacts it to a solid, manageable body.

2. The Prior Art

Previously, objects of this type have usually been compressed in closed pressure chambers and the pressure generated by pumping liquid into the pressure chamber. These are normally provided with at least one end closure held in position by a threaded casing. Opening, charging and sealing the pressure chamber takes a long time, thus causing high costs and limiting the value of the method and thus its usefulness in industrial operation on a large scale. Efforts have been made to produce tools for presses in which the liquid pressure necessary for the compression is generated within the tool.

In such a tool a high-pressure cylinder is used having two different inner diameters and an inner, axially movable cylinder constructed as a differential piston movable in the outer cylinder. The elastomeric sheath is arranged in the latter cylinder. When the inner cylinder is inserted the volume between the cylinders decreases and the pressure necessary for the compression process is thus developed. However, this tool has two constructional weaknesses which cause rapid wear and dangerous stresses from the fatigue point of view. It has proved almost impossible to prevent the powder from penetrating between the cylinders and sticking on the cylinder surface against which the seals glide. This causes rapid wear. When the inner cylinder is pushed into the outer, surrounding cylinder, in the mentioned embodiment the stresses in the outer cylinder will vary along its length so that it will be subjected to a "moving" bending stress. This, in combination with the irratically varying inner diameter, is unfavorable from the fatigue point of view and reduces the life of the tool.

SUMMARY OF THE INVENTION

In the tool according to the invention the mentioned disadvantages have been eliminated. The tool comprises a high-pressure cylinder, and a cylinder arranged inside this high-pressure cylinder and axially fixed in relation to the outer cylinder and so constructed that an annular space is formed between the cylinders. In the inner cylinder a sheath of elastomeric material is arranged and there are through channels between said annular space and a gap between the inner cylinder and the elastomeric sheath. The elastomeric sheath and pressure members projecting into this sheath at its ends forms a closed space for powder to be pressed to a product. The press tool is characterized substantially in that it comprises an annular piston which projects into the annular space between the high-pressure cylinder and the cylinder arranged inside this high-pressure cylinder and, together with the cylinders, forms a closed space which is filled with a pressure medium, for instance oil. Upon insertion of the piston into the annular space a pressure is generated, by which the elastomeric sheath is pressed against the powder enclosed in the mold cavity. The press tool is arranged in its press stand so that the annular piston is facing downwards and attached to the press table whereas the cylinders are vertically movable and during compression are moved towards the press table by the driving means of the press stand. The tool is usually also provided with an ejector and at least one operating cylinder which is turnable in the tool and has an eccentric cylinder path in relation to the turning axis. This type of operating cylinder is particularly useful for compressing tubes. The position of the operating piston can be adjusted to fit ejectors for tubes of different diameters merely by turning the operating cylinder.

BRIEF DESCRIPTION OF THE DRAWINGS

The invention is described further with reference to the accompanying FIGS. 1–4 which show the tool at four different stages during an operating cycle.

DESCRIPTION OF THE PREFERRED EMBODIMENTS

Figure 1:
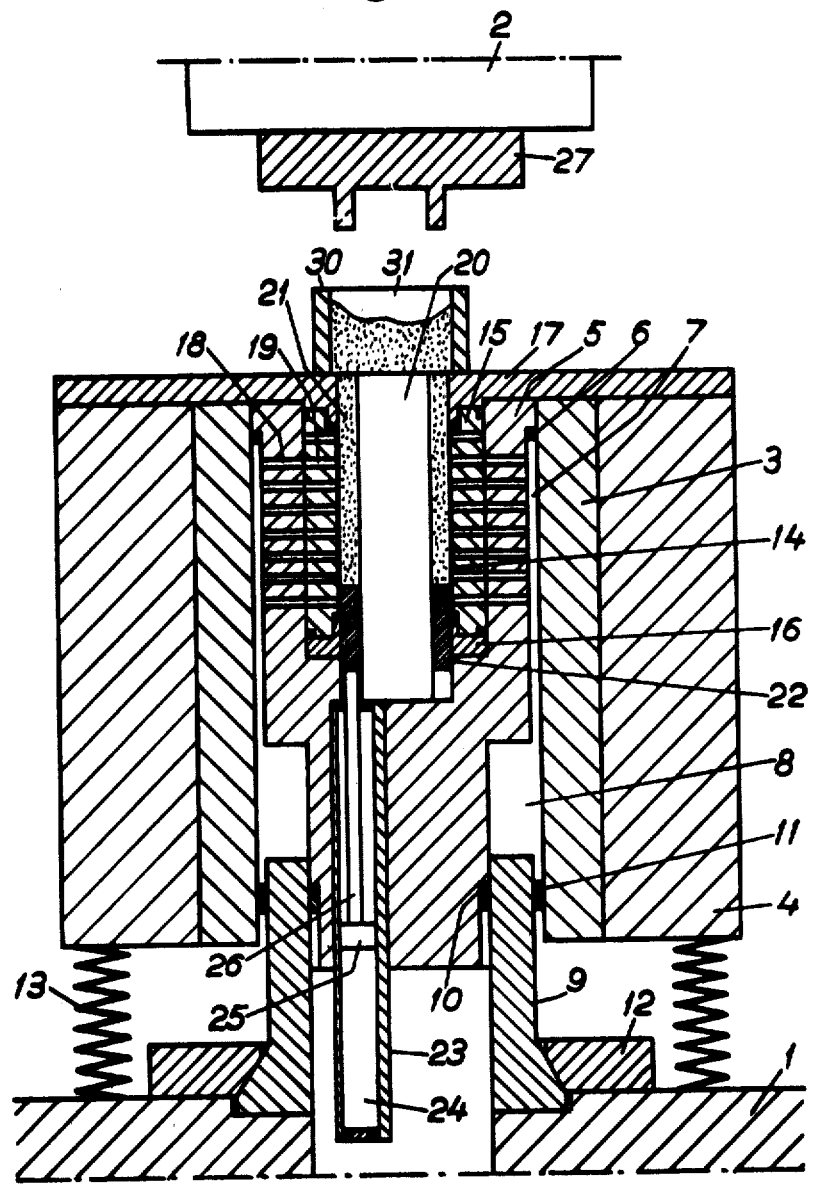

In the drawings, 1 designates a press table and 2 an operating piston in a press stand not otherwise shown. The pressure tool comprises a high-pressure cylinder consisting of an inner tube 3 and a tube 4 shrunk on to this. Instead of the tube 4 a sheath of wire or strip metal may be used which is wound on under prestressing. A support cylinder means composed in part of a cylinder 5 is inserted in the high-pressure cylinder. Its outer diameter is fitted at the upper end to the uppermost part of the high-pressure cylinder bore so that a sealing connection is obtained with the help of a sealing ring 6. The central and lower parts of the cylinder 5 have somewhat smaller and considerably smaller diameters, respectively, than the bore in the tube 3 so that gaps 7 and 8 are formed. An annular piston 9 projects from below into the annular gap 8. Between the piston and the cylinder 5 and the tube 3 are sealing rings 10 and 11. The piston 9 rests on the press table 1 and is attached to this by retaining rings 12. The high-pressure cylinder rests on a number of return springs 13 which, after a compressing operation, return the cylinder to the position shown in FIGS. 1 and 4. In the cylinder 5 is an elastomeric sheath 14 which is clamped between the cylinder 15 constituting the other part of the support cylinder means and the rings 16 and 17. Between the gap 7 and the outer surface of the sheath 14 are radial channels 18 and 19 in the cylinder 5 and the cylinder 15, respectively. The gaps 7 and 8 and the channels 18 and 19 are completely filled with pressure medium. In the cylinder 5 is a mandrel 20 so that a tubular space 21 is formed in the tool. In the tool is an ejector consisting of a ring 22 fitting the space 21 and a number of operating cylinders 23 turnably arranged in the cylinder 5. Its bore 24 is eccentrically positioned in the operating cylinder so that the abutment rod 26 can be connected to rings 22 of different diameters merely by turning the operating cylinder 23 in the cylinder 5 so that the position of the bore 24 in relation to the center of the cylinder is altered. A sealing and pressure member 27, fitting the space 21, is attached to the operating cylinder 2.

Figure 2:
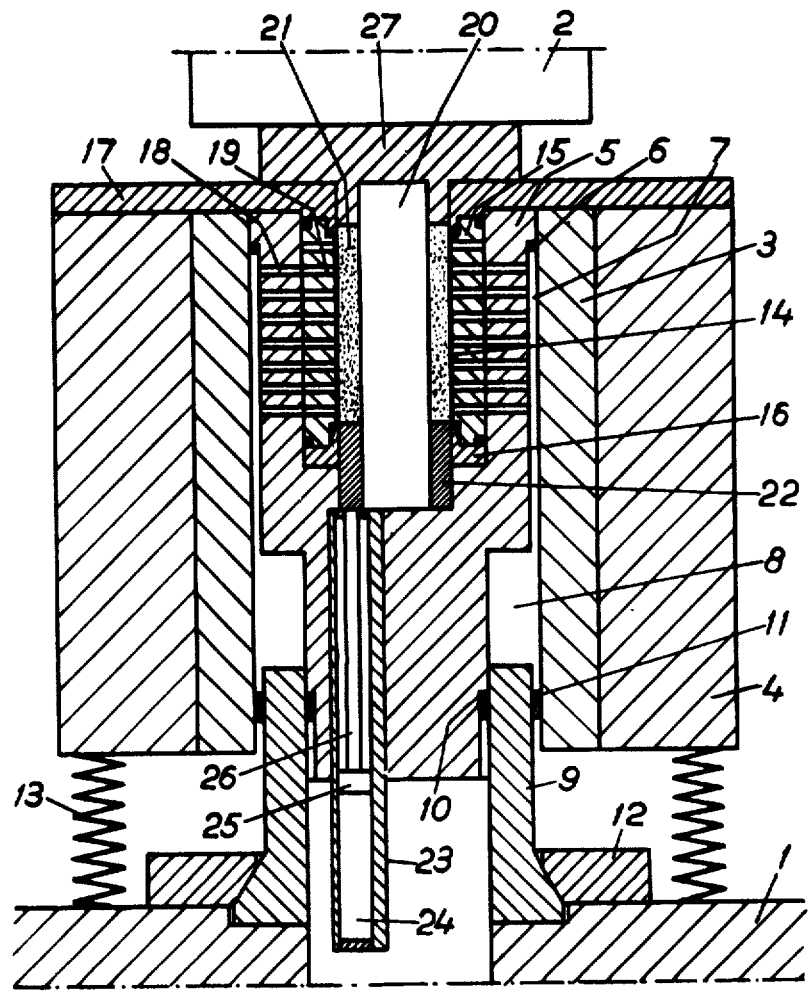
Figure 3:
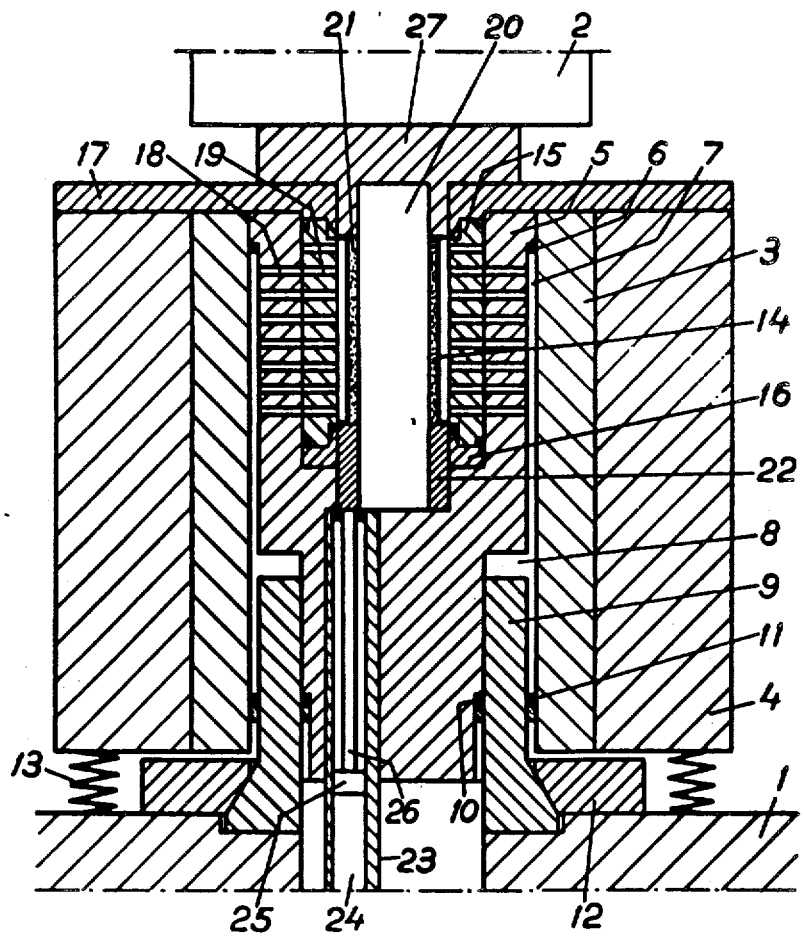
Figure 4:
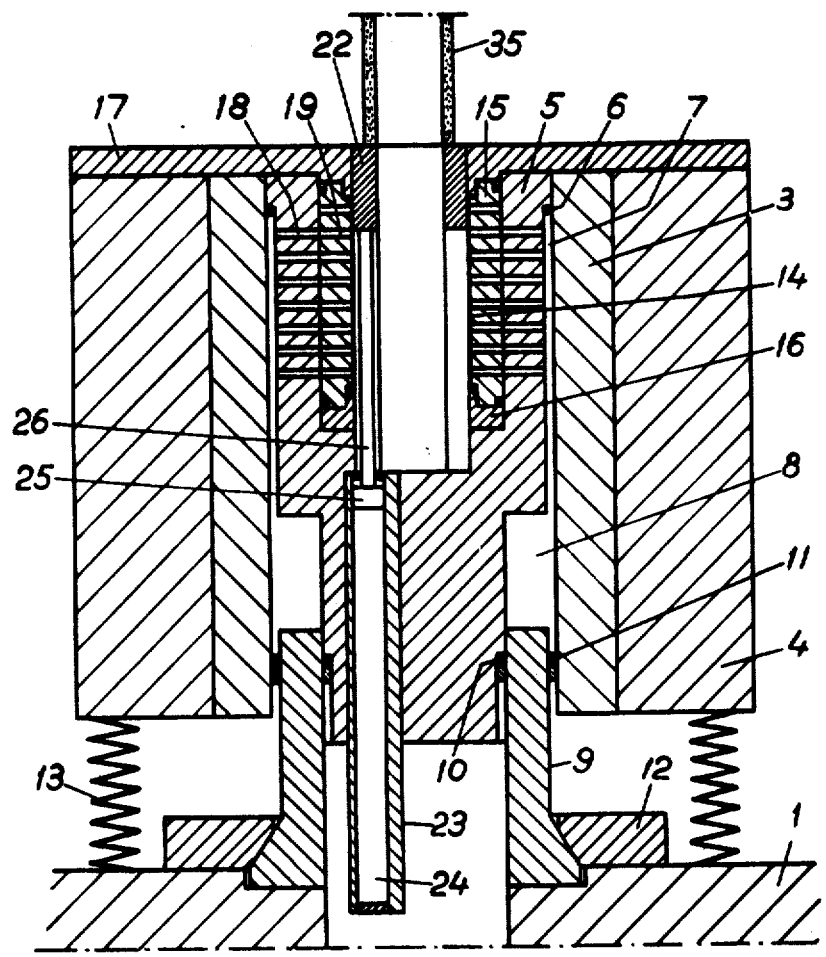

The tool operates in the following manner. A charger 30 with powder 31 is drawn over the tool as shown in FIG. 1. The powder falls into the space 21 and fills this. The quantity of powder can be regulated by raising the ejector ring 22 during the filling process, as shown in the drawing (raised position in FIG. 1). When the charger has been removed, the ring 22 is drawn down to its pressing position and the mold cavity 21 is sealed by the pressure cylinder 2 moving the sealing and pressure member 27 against the tool as shown in FIG. 2. Upon continued movement of the pressure cylinder, the entire tool unit resting on the springs 13 is pressed downwards thus forcing the piston 9 into the space 8 and forcing aside the liquid there. The liquid is forced through the gap 7 and the channels 18 and 19 against the outside of the elastomeric sheath 14 so that the powder will be pressed against the mandrel 20, as shown in FIG. 3. The pressure of the pressure medium enclosed in the tool is determined by the pressure from the operating cylinder 2. After the compression, the operating cylinder is returned and the movable tool part is lifted to the initial position by the springs 13, and the pressed component 35, a tube, is lifted out of the tool by the ejector, as shown in FIG. 4.

The invention is of course not limited the embodiment shown in the drawings, but many variations are feasible within the scope of the following claims.

1. Press tool having an elongated mold cavity for the production of bodies by compression of powder enclosed in the mold cavity, comprising a high-pressure cylinder (3,4), a support cylinder means (5,15) arranged inside the high-pressure cylinder, the interior of said support cylinder means constituting the mold cavity, said high-pressure cylinder and said support cylinder means forming an annular space (7,8) therebetween, a pressure medium enclosed in the annular space, a sheath (14) of elastomeric material arranged in the interior of the support cylinder means, said support cylinder means having through-channels (18-19) therein between said annular space and the outside of the sheath, and pressure members at the ends of the mold cavity to seal the cavity, the press tool including an annular piston (9) which projects into a part (8) of the annular space between the high-pressure cylinder and the support cylinder means, which piston, upon insertion into the annular space, generates a pressure medium enclosed therein, by which the elastomeric sheath is pressed against the powder enclosed in the mold cavity.

2. Press tool according to claim 1, having a press stand including a press table, in which the annular piston is stationary on the press table and in which the cylinders are vertically movable and during a compression are moved towards the press table by the movement of the press stand.

3. Press tool according to claim 1, comprising an ejector (22) and at least one operating cylinder (23) operatively connected to the ejector, which operating cylinder is turnable in the tool about an axis and has an eccentric cylinder path in relation to the turning axis.